Apr. 10, 1923.

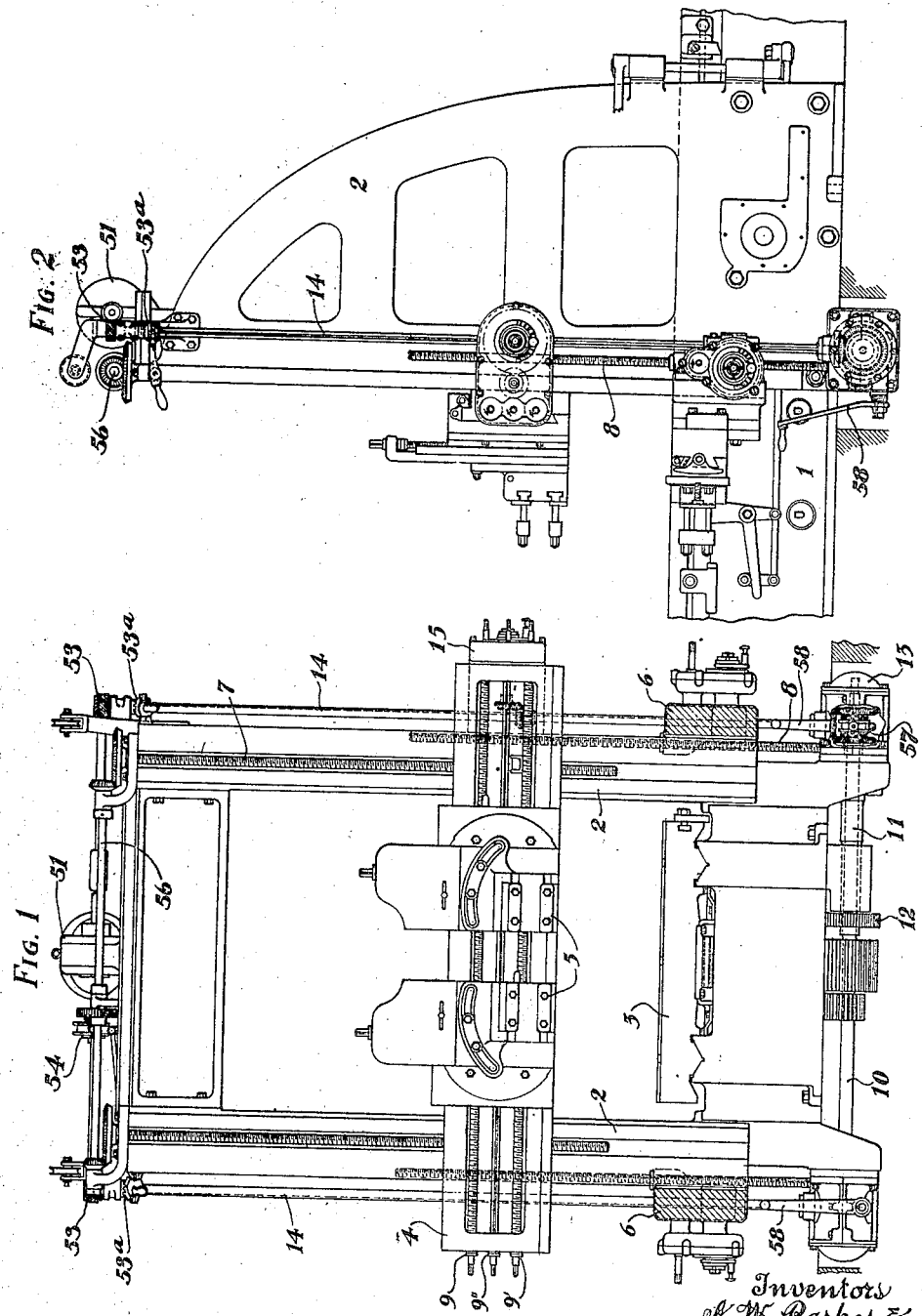

A. W. DRAESEKE ET AL

PLANER

Filed Feb. 2, 1921

Inventors
H. W. Parkes &
Alfred W. Draeseke
By Joseph K. Schofield
Attorney

Apr. 10, 1923.
A. W. DRAESEKE ET AL
PLANER
Filed Feb. 2, 1921
1,450,971
3 sheets-sheet 3
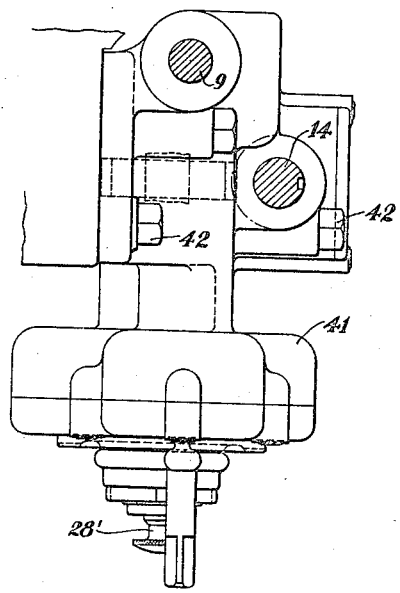
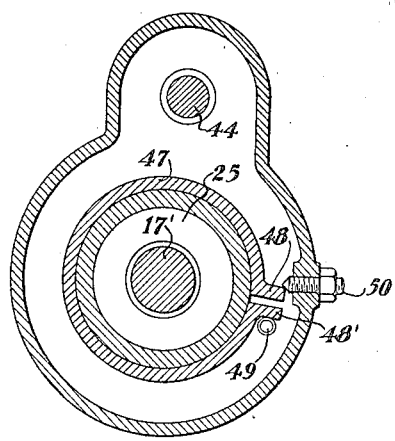
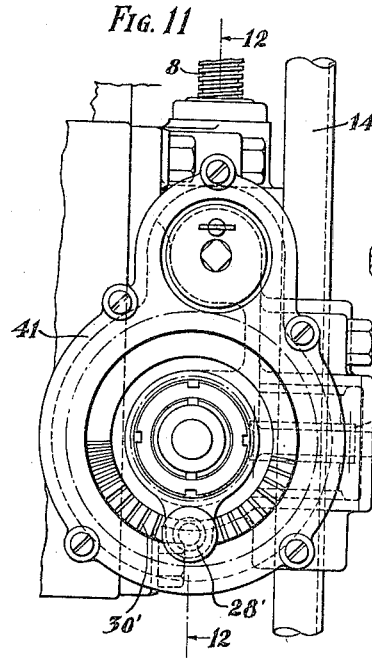
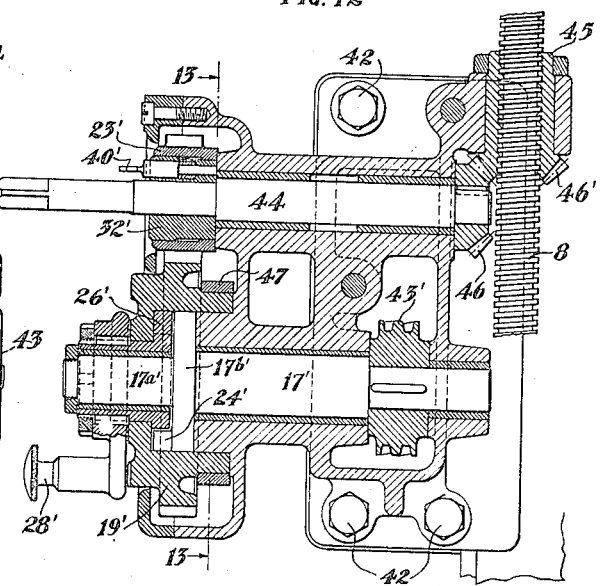

Patented Apr. 10, 1923.

1,450,971

UNITED STATES PATENT OFFICE.

ALFRED W. DRAESEKE AND ALBERT W. PARKES, OF DUNDAS, ONTARIO, CANADA, ASSIGNORS TO NILES-BEMENT-POND COMPANY, OF NEW YORK, N. Y., A CORPORATION OF NEW JERSEY.

PLANER.

Application filed February 2, 1921. Serial No. 441,846.

*To all whom it may concern:*

Be it known that we, ALFRED W. DRAESEKE and ALBERT W. PARKES, subjects of the King of Great Britain, residing at Dundas, in the Province of Ontario and Dominion of Canada, have invented certain new and useful Improvements in Planers, of which the following is a specification.

This invention relates particularly to tool feeding and traversing mechanisms of the type commonly used on planers for feeding the tool intermittently at the end of each cutting stroke and for rapidly traversing the tool. It is the general object of the invention to provide an improved mechanism of this character which will be very efficient and accurate in action and which may be easily and quickly adjusted to either feed or traverse the tool as may be desired.

One object of the invention is to provide separate feeding and traversing power means operating through a single shaft for feeding and traversing the tool, the feeding preferably being accomplished from the table reciprocating means and the traversing being performed preferably by a separate power means, as the electric motor illustrated.

It is a further object of the invention to provide a novel planer feed mechanism which is adapted for use on both the cross rail and uprights of a planer, both the cross rail and upright feed mechanisms on each side of the planer table being adapted to be operated by the same means extending upwardly from the table-operating mechanism on each side of the planer table.

It is a further object of the invention to provide a novel click box mechanism which will be positive in operation, very compact, and little likely to get out of order, such mechanism being adapted to cooperate with the tool feed mechanism to provide a very strong and compact structure.

With the above and other objects in view, which will appear as the description proceeds, the invention will now be described by reference to the drawing wherein:

Figure 1 is a front elevation of a planer having our improved feed mechanism applied thereto.

Figure 2A:
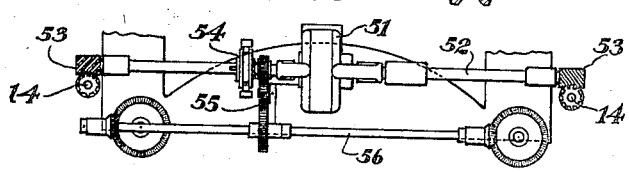
Fig. 2 is a side elevation.

Fig. 2ᵃ is a fragmentary plan view illustrating the motor and its driving connections.

Figure 3:
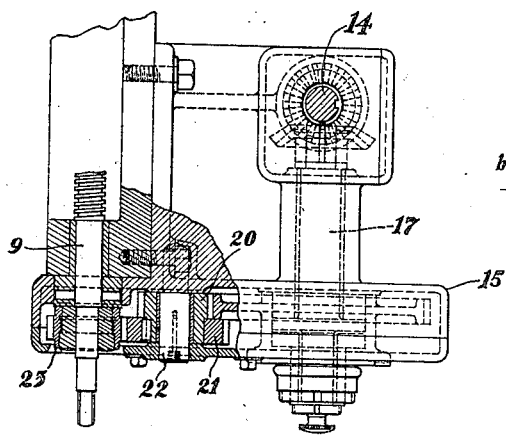
Figure 4:
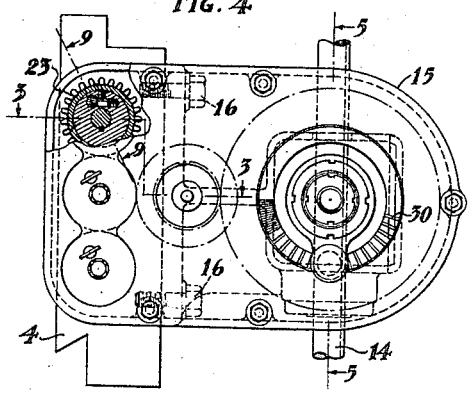

Fig. 3 is a detail plan view of the cross rail feed mechanism, a portion of the cross rail and other parts being shown as broken away and in section approximately on line 3—3 of Fig. 4.

Fig. 4 is an elevation of the same showing a corner of the feed box as broken away and one of the click boxes in cross section.

Figure 5:
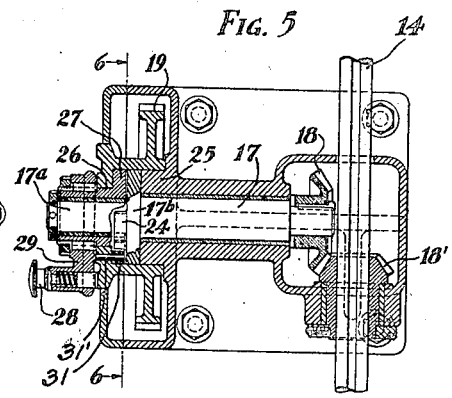

Fig. 5 is a sectional view of the same taken on line 5—5 of Fig. 4, certain parts being shown in elevation.

Figure 6:
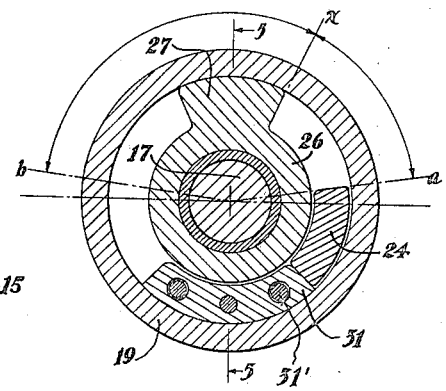

Fig. 6 is a cross section taken on line 6—6 of Fig. 5, looking in the direction of the arrow and showing certain parts comprising the driving and feed-adjusting mechanism.

Figure 7:
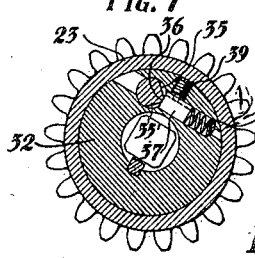
Figure 9:
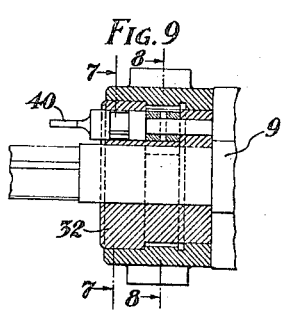

Fig. 7 is a cross section through the click box mechanism taken on line 7—7 of Fig. 9.

Figure 8:
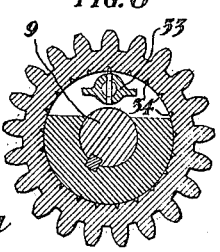

Fig. 8 is a cross section thereof taken on the line 8—8 of Fig. 9.

Fig. 9 is a longitudinal section of the same taken on line 9—9 of Fig. 4.

Fig. 10 is a plan of the tool feed mechanism as applied to a cutter head on an upright of the planer.

Fig. 11 is an end elevation thereof.

Fig. 12 is a longitudinal section of the same taken on the line 12—12 of Fig. 11.

Fig. 13 is a cross section taken on the line 13—13 of Fig. 12 and showing a friction brake applied to the feed gear to prevent overrun thereof.

Referring more specifically to the drawing by reference characters, 1 indicates the base and 2 the uprights of a standard planer. The planer is provided with the usual reciprocating table 3, cross rail 4, cutter heads 5, and side heads 6. The cross rail and side heads are vertically adjustable by means of the usual screw shafts 7 and 8 respectively and the cross heads are adapted to be fed along the cross rail by means of screw shafts 9 and 9', the tool heads being movable vertically by means of the shaft 9''.

Our improved tool feed mechanism may be operated by separate power means as a feed motor operated in synchronism with the reciprocation of the planer table or it may be operated directly from the table-operated mechanism. We have herein preferred to illustrate the same as operated directly from the table-operating mechanism. For this purpose, we have shown in Figs. 1 and 2 of the drawing a portion of a standard form of feed mechanism of this general type. In the construction illustrated, 10 indicates a shaft extending transversely through the base of the machine. A sleeve 11 is mounted on this shaft and carries a gear 12 which meshes with the reversing table-operated gearing. It will be seen that as the table is reciprocated, the gear 12 and sleeve 11 will be alternately rotated in opposite directions and a definite portion, usually not more than 180° in the standard planer, of this rotation in both directions is transmitted to the feed shaft 10 by means of the usual feed or clutch box mechanism 13. It should be clearly understood that the shaft 10 in operation is always oscillated through the same angular distance. The rotation of the feed shaft 10 is directly transmitted to the vertical feed shafts 14 by means of the usual bevel gear connection (not shown). As this clutch box mechanism within itself comprises no part of the present invention, further description thereof is omitted.

Referring more specifically to the tool feed mechanism and particularly the mechanism as adapted to the cross rail, it will be seen, by reference to Figs. 3 to 6, that this feed mechanism is enclosed in the casing 15 and secured as by bolts 16 to the cross rail 4. 17 indicates a shaft operatively connected to the vertical feed shaft 14 by bevel gears 18 and 18', the relative size of such gears herein and the rotation of the vertical shaft being such that the oscillation given to the feed shaft 17 is in the usual practice less than 180°. However, the degree of this oscillation may be varied as desired. The desired feeding movement is given to the cutter heads on the cross rail from the shaft 17 by means of a feed gear 19, the improved feed mechanism now to be specifically described, idler gears 20 and 21 on a stud 22, click box gears 23 and feed screws 9 and 9'.

As shown in Fig. 5, we preferably form the shaft 17 with a restricted extension 17$^a$ and with a flange 17$^b$ at the junction of the said extension with the shaft. As one element for driving the gear 19 we provide a tooth 24 which we preferably mount on the said flange 17$^b$. We have illustrated these elements 17, 17$^a$, 17$^b$ and 24 as integrally connected but it will be clearly understood that in practice the arrangement and mounting of these parts may be varied as desired within the scope of the invention. We preferably mount the feed gear 19 coaxially of the shaft 17 on a hub 25. Mounted on the extension 17$^a$ of the shaft 17 is a sleeve 26 carrying an abutment element or tooth 27 projecting into the path of movement of the driving tooth 24 on the shaft 17. A latch preferably comprising a spring-pressed pawl 28 mounted on a member 29 keyed to the sleeve 26 cooperates with notches 30 formed on the exterior portion of the gear 19 whereby the gear and sleeve may be locked together. It will be seen that this construction provides for an angular adjustment of the tooth 27. In operation, the driving tooth 24 in moving through its definite angular distance engages the driven tooth 27 and thereby drives the gear 19 through the desired angular distance, such distance depending upon the adjusted position of the latch member. The gear 19 may be returned to its initial position by any desired means, as for example, spring means. However, we prefer that the operation of the gear 19 shall be positive in both directions and for this purpose we provide the following mechanism. An abutment element 31 is secured to the interior of the gear 19 by means of pins 31' or otherwise, such abutment element being in the path of movement of the driving tooth 24. The elements 24, 27 and 31 preferably all project into the same plane as shown in Figs. 5 and 6 whereby the driving tooth 24 necessarily engages such abutments during its oscillatory movements.

The operation of this adjustable feed gear mechanism whereby a desired angular travel may be imparted to the feed gear 19 will now be described. It should be clearly understood that the driving tooth 24 always oscillates through the same angular distance as the path $a$—$b$ (Fig. 6) and it should be clear that in moving to the left, this tooth first moves freely through the distance $a$—$x$ until it strikes the tooth 27 which it carries through the remainder of the rotative stroke $x$—$b$. It should also be understood that the tooth 27 is locked to the gear 19 by means of the latch mechanism whereby the tooth 27 and abutment 31 maintain the relative position to which they are adjusted and in operation always move together in unison. As the driving tooth 24 rotates on its back stroke, it first passes freely through the angular distance $x$—$a$, in passing from engagement with the tooth 27 to the abutment 31, and then engages the abutment 31 and rotates the gear 19 in a reverse direction equal to the forward movement previously given to the gear. It should be clear that the angular distance $a$—$x$ represents the lost motion or idle travel of the tooth 24 and that the increase or decrease of such distance by adjusting the tooth 27 from or toward the tooth 24 and abutment 31 decreases or increases respectively the angular oscillatory travel given to the feed gear.

The motion of the feed gear in one direction is imparted to the feed screws 9 and 9' and shaft 9'' to feed the tools by the following mechanism: The feed gear 19 is operatively connected to the click box gear 23 through the idler gears 20 and 21. The click box is herein preferably mounted directly on the feed screw 9 as shown in Fig. 3. Our improved click box comprises the usual click box gear 23 within which is a bushing 32 keyed to the feed screw. A doubletoothed pawl 33 is rotatably mounted in this bushing in such position that its teeth may engage the ratchet teeth 34 within the gear. The shank of this pawl is provided with two relatively angular plane surfaces 35 and 35' and an intermediate plane surface 36. As a strong and compact means for holding the pawl in the desired position, we provide a plunger 37 normally held in engagement with one of the surfaces by means of a compression spring 38 and held from rotation by means of a threaded plug 39 engaging a longitudinal groove in the side of the plunger. All these elements are completely housed in bores in the bushing 32 and within the gear 23. An extension 40 on the shank of the pawl serves as a finger hold to turn the pawl to the desired position. It should be clear by reference to Figs. 4, 7, 8 and 9 that the rotative movement of the gear 23 in either direction may be transmitted to the bushing 32 and screw 9 by turning the extension 40 to engage the proper pawl tooth with the ratchet teeth 34 and that the plunger 37 by engagement with the proper plane surface of the pawl shank serves to hold the pawl tooth in engagement. It should be further noted that the pawl may be held in a neutral position, as shown in Fig. 7, if desired, by engaging the plunger with the intermediate surface 36. As illustrated in Fig. 4, we preferably mount a click box mechanism on each shaft 9, 9' and 9" with the gears 23 thereof in mesh, whereby each of the said shafts may be individually driven in either direction or set to remain idle if desired.

In Figs. 10, 11, and 12, we have shown the same feed mechanism as applied to a cutter head mounted on an upright of the machine, the feed mechanism casing 41 being shown as secured to the cutter head by bolts 42. In such views of the drawing, the parts corresponding to the parts shown in Figs. 3 to 9 and described above, are indicated by the same reference characters primed. By reference to Figs. 1, 2, 10 and 11 it will be seen that the vertical oscillating shaft 14 passes through the casing 41 and drives the oscillating feed shaft 17' by means of spiral gears 43 and 43' mounted respectively on the said shafts. Instead of mounting the click box directly on the feed screw or on the feed screw nut, we herein mount such mechanism on the shaft 44 operatively connected to the feed nut 45 on the vertical screw 8 by means of bevel gears 46 and 46'. Otherwise this tool feed mechanism is the same as that above described in reference to the cross rail tool feed and further description will therefore be omitted.

We may also provide either or both feed mechanisms with a friction device for checking the inertia of the feed gear to prevent overrun thereof. We have, however, herein preferred to show such a device only in connection with the side head mechanism. As illustrated in Figs. 12 and 13, this device comprises a friction ring 47 mounted on a hub of the feed gear 19' and having projecting ends 48 and 48'. This ring is held from rotation by means of pins 49 and 50 seated in the casing or housing 41, the pin 50 being screw-threaded and provided with a conical end for adjusting the friction ring.

The general operation of the feed mechanism is as follows: The shaft 10 is oscillated by the table operating mechanism as above described. This oscillation is transmitted to the vertical feed shafts 14 which are always oscillated through a definite and the same angular distance. This oscillatory movement is transmitted to the feed shafts 17 and 17' and the driving teeth 24 and 24' from which the desired angular movement is imparted to the feed gears 19 and 19'. The movement of the feed gear 19 is transmitted to the click box gears on the cross rail as shown in Fig. 4, from whence the cutter heads may be fed along the cross rail in either direction as desired. The screw shaft 8 is normally stationary and as shown in Fig. 12, the feed motion imparted to the feed nut 45 feeds the cutter vertically in either direction as desired. It will be noted that the shafts 9, 9', 9" and 44 are provided with squared ends whereby the tool head may be moved manually, the pawl 33 being in a neutral position at such time as shown in Fig. 8.

In combination with the novel tool feeding mechanism above described, we further provide a separate power means for traversing the tool heads. As illustrated in Figs. 1, 2 and 3, we mount an electric motor 51 on the uprights and connect the armature shaft 52 thereof to the vertical feed shafts 14 through spiral gears 53 and clutches 53ª. The motor is also adapted to be operably connected to the rail elevating screws 7 through a clutch 54, gears 55 and shaft 56. As illustrated in Fig. 1, the feeding connection to each vertical feed shaft 14 may be disengaged by means of a clutch 57 operated by a handle 58.

During the feeding operation the shaft 52 and the motor armature are adapted to be disconnected from the vertical feed shafts 14 by means of clutches 53ª. When it is desired to traverse the tool heads, each clutch 57 is placed in a neutral position and each clutch 53ª in an engaging position whereupon the shafts 14 are free to be rotated continuously by the motor. One shaft 14 is operatively connected to a side head 6 and the cross rail heads 5 while the other shaft 14 is connected to the other side head only. It should be noted that the feed box mechanism transmits either feeding or traversing motion without requiring any adjustment whatever, it being only necessary to place the click box pawl in the direction it is desired to feed or traverse. The motor may be used to raise or lower the cross rail by throwing in the clutch 54.

What we claim is:

1. In a planer, the combination of a reciprocating table, a tool head adjacent the table, a feed screw for moving the head, mechanism including a shaft intermittently operated from the table reciprocating means for feeding the tool through the feed screw at each table reciprocation, and a separate power means for traversing the tool, the feeding and traversing mechanism being adapted to operate through the same means to move the tool.

2. In a planer, the combination of a reciprocating table, a tool head adjacent the table, a feed screw for moving the head, mechanism including a shaft intermittently operated from the table reciprocating means for feeding the tool through the feed screw at each table reciprocation, and an electric motor adapted to operate through the said shaft to traverse the tool.

3. In a planer, the combination of a reciprocating table, a tool head adjacent the table, a feed screw for moving the head, mechanism including a shaft intermittently operated from the table reciprocating means for feeding the tool through the feed screw at each table reciprocation, an electric motor adapted to operate through the said shaft to traverse the tool, and a clutch for operatively connecting the motor to the said shaft.

4. In a planer, the combination of a reciprocating table, an upright at each side of the table, a cross rail mounted on the uprights, a tool head mounted on the cross rail, a feed screw for moving the head, mechanism including a vertically extending shaft intermittently operated from the table reciprocating means for feeding the tool through the feed screw at each table reciprocation, an electric motor mounted on the uprights, and a clutch for operatively connecting the motor to the said shaft, the motor being adapted to either traverse the tool or adjust the rail vertically on the uprights.

5. In a planer, the combination of a reciprocating table, a feed screw for moving the head, a feed shaft, a motor operatively connected to the shaft, a single driving connection from the shaft to the feed screw, mechanism for intermittently and automatically feeding the head through the shaft and connection in synchronism with the table reciprocation, and means for controlling the continuous operation of the motor for traversing the head, the feeding and traversing of the head taking place from the shaft to the screw through the said single driving connection.

6. In a planer, the combination of a reciprocating table, a tool head, a feed screw for moving the head, a feed shaft, a motor operatively connected to the shaft, a single driving connection from the shaft to the feed screw, mechanism for intermittently and automatically feeding the head through the shaft and connection in synchronism with the table reciprocation, means for controlling the continuous operation of the motor for traversing the head, the feeding and traversing of the head taking place from the shaft to the screw through the said single driving connection, and means for varying the amount of feeding movement given to the head.

7. In a planer, the combination of a reciprocating table, a tool head, a feed screw for moving the head, a feed shaft, a motor operatively connected to the shaft, a single driving connection from the shaft to the feed screw, mechanism for intermittently and automatically feeding the head through the shaft and connection in synchronism with the table reciprocation, means for controlling the continuous operation of the motor for traversing the head, the feeding and traversing of the head taking place from the shaft to the screw through the said single driving connection, and lost motion means in the said connection for varying the amount of feeding movement given to the head.

8. A planer comprising a bed having a table mounted thereon for reciprocation, a cutter head and feed screw therefor, in combination with a planer feed mechanism comprising a shaft adapted to be oscillated in synchronism with the stroke of the planer table, a driving element driven by the shaft, a feed gear operatively connected to the planer tool feed screw, a driven element in the path of movement of the driving element, means for locking said gear and driven element together in different relative positions whereby to vary the lost motion of the driving element and give different length feeds to the feed gear and cutter head, and means whereby the feed gear is returned to its starting position.

9. A planer comprising a bed having a table mounted thereon for reciprocation, a cutter head and feed screw therefor, in combination with a planer feed mechanism comprising a shaft adapted to be oscillated in synchronism with the stroke of the planer table, a gear operatively connected to the planer tool feed screw, an abutment on the gear, a driven element, means for adjustably locking said gear and driven element together, and a driving element driven by the shaft to alternately engage and drive the driven element and gear abutment whereby the gear is alternately driven in opposite directions through a desired angular distance.

10. A planer comprising a bed having a table mounted thereon for reciprocation, a cutter head and feed screw therefor, in combination with a planer feed mechanism comprising an oscillating shaft, a driving connection between the table operating mechanism and said shaft whereby the shaft is oscillated as the table is reciprocated, a driving element driven by the shaft, a feed gear operatively connected to the planer tool feed screw, a driven element in the path of movement of the driving element, means for locking said gear and driven element together in different relative positions whereby to vary the lost motion of the driving element and give different length feeds to the feed gear and cutter head, and means whereby the feed gear is returned to its starting position.

11. A planer comprising a bed having a table mounted thereon for reciprocation, a cutter head and feed screw therefor, in combination with a planer feed mechanism comprising an oscillating shaft, a driving connection between the table operating mechanism and said shaft whereby the shaft is oscillated as the table is reciprocated, a gear operatively connected to the planer tool feed screw, an abutment on the gear, a driven element, means for adjustably locking said gear and driven element together, and a driving element driven by the shaft to alternately engage and drive the driven element and gear abutment whereby the gear is alternately driven in opposite directions through a desired angular distance.

12. A planer comprising a bed having a table mounted thereon for reciprocation, a cutter head and feed screw therefor, in combination with a planer feed mechanism comprising an oscillating shaft, a driving connection between the table operating mechanism and said shaft whereby the shaft is oscillated as the table is reciprocated, a driving element driven by the shaft, a feed gear mounted coaxially of the shaft and operatively connected to the planer tool feed screw, a driven element also mounted coaxially of the shaft and in the path of movement of the driving element, means for locking the feed gear and driven element together in different relative positions whereby to vary the lost motion of the driving element and give different length feeds to the feed gear and cutter head, and means whereby the feed gear is returned to its starting position.

13. A planer comprising a bed having a table mounted thereon for reciprocation, a cross rail and uprights both having cutter heads and feed screws thereon, in combination with a planer feed mechanism for each head comprising an oscillating shaft, a driving element driven by the shaft, a feed gear operatively connected to the feed screw, a driven element in the path of movement of the driving element, means for locking the feed gear and driven element together in different relative positions whereby to vary the lost motion of the driving element and give different length feeds to the feed gear and cutter head, means whereby the feed gear is returned to its starting position, and driving means operatively connecting the table operating mechanism with the oscillating shaft of each of the said feed mechanisms.

14. A planer comprising a bed having a table mounted thereon for reciprocation, a cross rail and uprights both having cutter heads and feed screws thereon, in combination with the planer feed mechanism for each head comprising an oscillating shaft, a feed gear operatively connected to the feed screw, an abutment on the gear, a driven element, means for locking said gear and driven element together in different relative positions, a driving tooth on the shaft to alternately engage and drive the driven element and gear abutment whereby the gear is alternately driven in opposite directions through a desired angular distance, and driving means operatively connecting the table operating mechanism with the oscillating shaft of each of the said feed mechanisms.

15. A planer comprising a bed having a table mounted thereon for reciprocation, a cross rail and uprights both having cutter heads and feed screws thereon, in combination with a planer feed mechanism for each head comprising an oscillating shaft, a driving element driven by the shaft, a gear mounted coaxially of the shaft and operatively connected to the feed screw, a driven element also mounted coaxially of the shaft and in the path of movement of the driving element, means for locking said gear and driven element together in different relative positions whereby to vary the lost motion of the driving element and give different length feeds to the feed gear and cutter head, means whereby the feed gear is returned to its starting position, and an oscillating shaft operatively connecting the table operating mechanism with the oscillating shaft of each of the feed mechanisms.

16. In a tool feed mechanism, the combination of a feed screw, an oscillating member, a driving tooth driven by the member, a second member mounted coaxially of the first member and operatively connected to the feed screw, a driven tooth for the second member in the path of movement of the driving tooth, means for adjustably locking one of said teeth to its respective member whereby a desired portion of the angular movement of the first member in one direction is given to the second member, and means whereby the second member is returned to its starting position.

17. In a tool feed mechanism, the combination of a feed screw, an oscillating member, a second member mounted coaxially of the first member and operatively connected to the feed screw, two abutment elements on one of the members, one of said elements being adjustable thereon, and an abutment element on the other member in the path of movement of the said two abutment elements whereby the oscillating member drives the second member alternately in opposite directions through a desired angular distance.

18. In a tool feed mechanism, the combination of a feed screw, an oscillating shaft, a driving tooth driven by the shaft, a feed gear operatively connected to the feed screw, a driven element in the path of movement of the driving tooth, means for locking said gear and driven element together in different relative positions whereby to vary the lost motion of the driving tooth and give different angular movements to the feed gear in one direction, and means whereby the feed gear is returned to its starting position.

19. In a tool feed mechanism, the combination of a feed screw, an oscillating shaft, a driving tooth on the shaft, a feed gear operatively connected to the feed screw, a driven element in the path of movement of the driving tooth, means for adjustably locking said gear and driven element together whereby a desired portion of the angular movement of the oscillating shaft in one direction is given to the feed gear, and positive acting means whereby the feed gear is returned to its starting position.

20. In a tool feed mechanism, the combination of a feed screw, an oscillating shaft, a driving tooth on the shaft, a feed gear mounted coaxially of the shaft, operatively connected to the feed screw, and adapted to be driven by the driving tooth, a driven element mounted coaxially of the shaft and projecting into the path of movement of the driving tooth, and means for locking said gear and driven element together in different relative positions whereby to vary the lost motion of the driving tooth and give different angular movements to the feed gear in one direction, and means whereby the feed gear is returned to its starting position.

21. In a tool feed mechanism, the combination of a feed screw, an oscillating shaft, a driving tooth on the shaft, a feed gear mounted coaxially of the shaft, operatively connected to the feed screw and adapted to be driven by the driving tooth, a driven element in the path of movement of the driving tooth, and a latch for locking said gear and driven element together in different relative positions whereby to vary the lost motion of the driving tooth and give different angular movements to the feed gear in one direction and means whereby the feed gear is returned to its starting position.

22. In a tool feed mechanism, the combination of a feed screw, an oscillating shaft, a driving tooth on the shaft, a feed gear mounted coaxially of the shaft, operatively connected to the feed screw and adapted to be driven in one direction by the driving tooth, a driven element mounted coaxially of the shaft, a tooth on the driven element in the path of movement of the driving tooth, and a latch on the driven element adapted to cooperate with indexed notches in the feed gear for adjustably locking the gear and driven element together, and means whereby the feed gear is returned to its starting position.

23. In a tool feed mechanism, the combination of a feed screw, an oscillating shaft, a feed gear mounted coaxially of the shaft and operatively connected to the feed screw, an abutment element on the gear, a second abutment element adapted to be secured to the gear in different relative positions, and a driving element driven by the oscillating shaft to alternately engage and drive the said two abutment elements and gear whereby the gear is alternately driven in opposite directions through a desired angular distance.

24. In a tool feed mechanism, the combination of a feed screw, an oscillating shaft, a feed gear mounted coaxially of the shaft and operatively connected to the feed screw, an abutment element on the gear, a member also mounted coaxially of the shaft and adapted to be adjustably secured to the gear, an abutment element on the said member, and a driving tooth on the oscillating shaft adapted to alternately engage and drive the said two abutment elements whereby the gear is alternately driven in opposite directions through a desired angular distance.

25. In a tool feed mechanism, the combination of a feed screw, an oscillating shaft, a feed gear mounted coaxially of the shaft and operatively connected to the feed screw, an abutment element on the gear, a member also mounted coaxially of the shaft, a latch on the member adapted to cooperate with indexed notches in the gear for adjustably locking the gear and member together, an abutment element on the member, and a driving tooth on the oscillating shaft adapted to alternately engage and drive the said two abutment elements whereby the gear is alternately driven in opposite directions through a desired angular distance.

26. In a tool feed mechanism, the combination of a feed screw, an oscillating member, a driving tooth driven by the member, a second member mounted coaxially of the first member and operatively connected to the feed screw, a friction device normally tending to prevent rotation of the second member, a driven tooth for the second member in the path of movement of the driving tooth, means for adjustably locking one of said teeth to its respective member whereby a desired portion of the movement of the first member in one direction may be given to the second member, and means whereby the second member is returned to its starting position.

27. In a tool feed mechanism, the combination of a feed screw, an oscillating shaft, a driving element driven by the shaft, a feed gear operatively connected to the feed screw, a friction device non-rotatably engaging the gear, a driven element in the path of movement of the driving element, means for locking said gear and driven element together in different relative positions whereby to vary the lost motion of the driving element and give different angular movements to the feed gear in one direction, and means whereby the feed gear is returned to its starting position.

28. In a tool feed mechanism, the combination of a feed screw, an oscillating shaft, a driving tooth on the shaft, a feed gear mounted coaxially of the shaft, operatively connected to the feed screw, and adapted to be driven by the driving tooth, a friction ring non-rotatably surrounding the gear, a driven element mounted coaxially of the shaft and in the path of movement of the driving tooth, means for locking said gear and driven element together in different relative positions whereby to vary the lost motion of the driving tooth and give different angular movements to the feed gear in one direction, and means whereby the feed gear is returned to its starting position.

29. In a tool feed mechanism, the combination of a feed screw, an oscillating shaft, a feed gear mounted coaxially of the shaft and operatively connected to the feed screw, a friction device normally tending to prevent rotation of the gear, an abutment element on the gear, a second abutment element adapted to be adjustably secured to the gear, and a driving element driven by the oscillating shaft to alternately engage and drive the said two abutment elements whereby the gear is alternately driven in opposite directions through a desired angular distance.

30. In a metal cutting machine having a cutter head, a screw shaft for feeding the head and a ratchet mechanism adapted to be operatively connected to the shaft, the combination of an oscillating driving element, a feed gear operatively connected to the ratchet mechanism, a driven element in the path of movement of the driving element, means for locking the feed gear and driven element together in different relative positions whereby to vary the lost motion of the driving element and give different length feeds to the feed gear and cutter head, and means whereby the feed gear is returned to its starting position.

31. In a metal cutting machine having a cutter head, a screw shaft for feeding the head and a ratchet mechanism adapted to be operatively connected to the shaft, the combination of an oscillating shaft, a feed gear operatively connected to the ratchet mechanism, an abutment element on the gear, a second abutment element adapted to be adjustably secured to the gear, and a driving element driven by the oscillating shaft to alternately engage and drive the said two abutment elements whereby the gear is alternately driven in opposite directions through a desired angular distance.

32. In a metal cutting machine having a cutter-supporting rail, a cutter head mounted thereon, a screw shaft for feeding the head, and a ratchet click box operatively connected to the screw shaft within a click box gear, the combination of an oscillating shaft, a feed gear operatively connected to the click box gear, an abutment element on the gear, a member mounted coaxially of the shaft and adapted to be adjustably secured to the gear, an abutment element on the said member, and a driving tooth on the oscillating shaft adapted to alternately engage and drive the said two abutment elements whereby the gear is alternately driven in opposite directions through a desired angular distance.

In testimony whereof, we hereto affix our signatures.

ALFRED W. DRAESEKE.
ALBERT W. PARKES.

Witnesses:
J. IRWIN,
F. P. NELSON.